(12) United States Patent
Leung et al.

(10) Patent No.: US 9,734,071 B2
(45) Date of Patent: Aug. 15, 2017

(54) METHOD AND APPARATUS FOR HISTORY-BASED SNOOPING OF LAST LEVEL CACHES

(71) Applicant: Oracle International Corporation, Redwood City, CA (US)

(72) Inventors: Serena Leung, South San Francisco, CA (US); Ramaswamy Sivaramakrishnan, San Jose, CA (US); Joann Lam, San Francisco, CA (US); David Smentek, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 14/713,053

(22) Filed: May 15, 2015

(65) Prior Publication Data

US 2016/0335184 A1    Nov. 17, 2016

(51) Int. Cl.

| G06F 12/00 | (2006.01) |
|---|---|
| G06F 13/00 | (2006.01) |
| G06F 13/28 | (2006.01) |
| G06F 12/0846 | (2016.01) |
| G06F 12/0831 | (2016.01) |
| G06F 12/0842 | (2016.01) |
| G06F 12/0802 | (2016.01) |

(52) U.S. Cl.
CPC ...... *G06F 12/0848* (2013.01); *G06F 12/0831* (2013.01); *G06F 12/0802* (2013.01); *G06F 12/0842* (2013.01); *G06F 2212/282* (2013.01); *G06F 2212/621* (2013.01)

(58) Field of Classification Search
CPC ............. G06F 12/0802; G06F 12/0842; G06F 12/0848
USPC .......................................................... 711/129
See application file for complete search history.

(56) References Cited

U.S. PATENT DOCUMENTS

| 8,015,364 | B2 | 9/2011 | Blumrich | |
|---|---|---|---|---|
| 8,103,836 | B2 | 1/2012 | Blumrich | |
| 8,677,073 | B2 | 3/2014 | Blumrich | |
| 2006/0020769 | A1* | 1/2006 | Herrell | G06F 9/5077 712/13 |
| 2015/0227464 | A1* | 8/2015 | Guthrie | G06F 12/0862 711/146 |

* cited by examiner

*Primary Examiner* — Charles Rones
*Assistant Examiner* — Sidney Li
(74) *Attorney, Agent, or Firm* — Meyertons, Hood, Kivlin, Kowert & Goetzel, P.C.; Erik A. Heter (57) ABSTRACT

A method and apparatus for snooping caches is disclosed. In one embodiment, a system includes a number of processing nodes and a cache shared by each of the processing nodes. The cache is partitioned such that each of the processing nodes utilizes only one assigned partition. If a query by a processing node to its assigned partition of the cache results in a miss, a cache controller may determine whether to snoop other partitions in search of the requested information. The determination may be made based on history of where requested information was obtained from responsive to previous misses in that partition.

17 Claims, 7 Drawing Sheets

METHOD AND APPARATUS FOR HISTORY-BASED SNOOPING OF LAST LEVEL CACHES

BACKGROUND

1. Technical Field

This disclosure relates to computer systems, and more particularly, to caches in a computer system that are shared by multiple processing agents.

2. Description of the Related Art

Modern computer systems and processors therein typically include a number of different cache memories. A cache memory is a memory located in a memory hierarchy between registers (e.g., from where operands are fetched for the execution by execution units) and main memory (e.g., random access memory). Various levels of cache memory may be implemented, such as a level one (L1) cache, L2 cache, L3 cache, etc. The L1 cache may be the highest level cache, closest to the registers and execution units, with the L2 being at the next level down, and so on. A last level cache may be a cache that is closest to main memory within the memory hierarchy. When an execution unit needs data that is not already stored in a register, it may first query the L1 cache, then the L2 cache (if the data is not stored in the L1 cache) and so on. If the requested data is not stored in any cache, then the data may be accessed from memory, at a greater latency than with cache accesses.

Many modern processors and systems on a chip (SoCs) include multiple processor cores, i.e. multiple processors implemented on a common integrated circuit (IC) die. In such processors, multiple levels of cache memories may be implemented. Moreover, in some ICs having multiple processors implemented thereon, a last level cache (e.g., an L3 cache) may be shared by each of the processor cores.

SUMMARY OF THE DISCLOSURE

A method and apparatus for snooping caches is disclosed. In one embodiment, a system includes a number of processing nodes and a cache shared by each of the processing nodes. The cache is partitioned such that each of the processing nodes utilizes only one assigned partition. If a query by a processing node to its assigned partition of the cache results in a miss, a cache controller may determine whether to snoop other partitions in search of the requested information. The determination may be made based on history of where requested information was obtained from responsive to previous misses in that partition.

In one embodiment, each of the partitions of the cache are associated with at least one of a number of history registers. Each history register may record history for a most recent N misses in its corresponding one of the partitions. Each entry in the history register may indicate the source of requested information that triggered the miss in the corresponding partition, and more particularly, whether the requested information was found in another partition of the cache, or in main memory. More broadly, the history register may indicate a recent level of success in finding requested information in other partitions of the cache responsive to misses in its associated one of the partitions. If the history register indicates that recent misses to its associated partition have resulted in the requested information being found in another partition, the cache controller may snoop the other partitions. If the history register indicates that recent misses to its associated partition have not resulted in the requested information being found in other partitions of the cache, the cache controller may forgo snooping any may instead conduct a search of a directory for the requested information.

In one embodiment, each partition may be associated with two history registers. A first history register may store information regarding misses in the partition during requests for data. A second history register may store information regarding misses in the partition regarding requests for instructions. In some embodiments, mechanisms other than registers may be used to indicate the history for recent misses in the various partitions of the cache.

The cache may be a last level cache in a memory hierarchy, i.e. the lowest level cache and just above the main memory in the overall hierarchy. However, the method and apparatus described here may apply to any cache that is partitioned and shared among a number of different agents, threads, etc.

The various embodiments of an apparatus and method disclosed herein may provide performance gains relative to prior art embodiments. In some prior art embodiments, any cache miss results in a search of a directory to locate the data in memory. A search of the directory typically involves a significantly greater latency than a cache hit, even if the directory search ultimately determines that the requested data was cached. In other prior art embodiments, any cache miss in one partition may result in snoops of all other partitions. This in results in increases of both bandwidth consumption and power consumption in the cache subsystem, and the latency penalty can be even greater if the extra snoops all result in misses. In contrast to these prior art embodiments, the various apparatus and method embodiments disclosed use the history of previous cache misses in each partition to determine whether the other partitions will be snooped responsive to a present cache miss. In particular, if the history indicates a higher likelihood that, responsive to a miss in a particular partition the requested data is in another partition, then a snoop of the other partitions is conducted. Otherwise, if the history indicates a lower likelihood that the requested data is in another partition, no extra snooping is performed. This may result in more efficient usage of the resources of the cache subsystem in terms of power usage, bandwidth usage, and overall performance.

BRIEF DESCRIPTION OF THE DRAWINGS

Other aspects of the disclosure will become apparent upon reading the following detailed description and upon reference to the accompanying drawings which are now described as follows.

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION

Figure 1A:
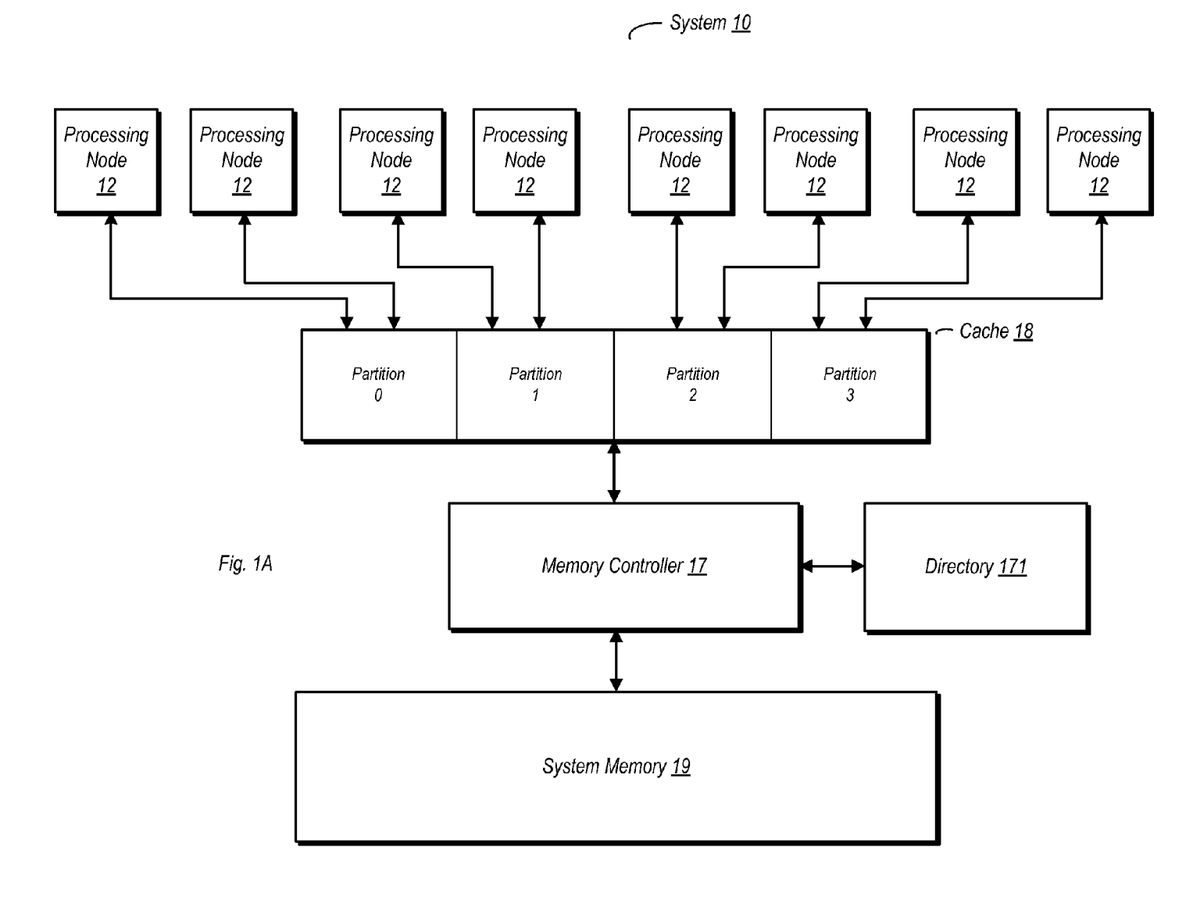
FIG. 1A is a block diagram of one embodiment of a system having multiple processing nodes.

FIG. 1A is a simplified block diagram of one embodiment of a system having multiple processing nodes. In the embodiment shown, eight processing nodes 12 are implemented in system 10. The processing nodes 12 may be, e.g., processor cores on a multi-processor IC, or may be stand-alone processors in a computer system. In various embodiments, each of the processing nodes 12 may be configured to concurrently execute multiple threads.

Each of the processing nodes 12 is coupled to a cache 18. In this embodiment, cache 18 is a last level cache, i.e. it is the lowest level cache in the memory hierarchy, and thus is the one logically closest to system memory 19. Each processing node 12 may also include additional caches, for example, at least one level 1 (L1) cache and at least one L2 cache. In this particular embodiment, cache 18 is an L3 cache, although the scope of this disclosure is not limited to any particular cache level.

Cache 18 is coupled to memory controller 17, which in turn is coupled to a system memory 19. System memory 19 may serve as the main memory for system 10. Memory controller 17 in the embodiment shown is configured to maintain a directory 171 to which it is coupled. The directory 171 may include information about data and instructions stored in system memory, as well as information about which cache certain data and instructions may be stored within.

In the embodiment shown, cache 18 is partitioned. In this particular example, cache 18 includes four different partitions, partitions 0-3. The number of partitions may vary from one embodiment to the next. Each of the processing nodes 12 may be assigned to a single partition, and each partition may be shared by more than one processing node 12. In this embodiment, each partition is shared by two different processing nodes 12. A given processing node 12 may use its partition for cache storage of data and or instructions, but may be excluded from using other ones of the partitions. Correspondingly, each partition may be assigned to provide cache storage only for particular ones of the processing nodes 12, while not providing cache storage for other ones of the processing nodes.

Figure 1B:
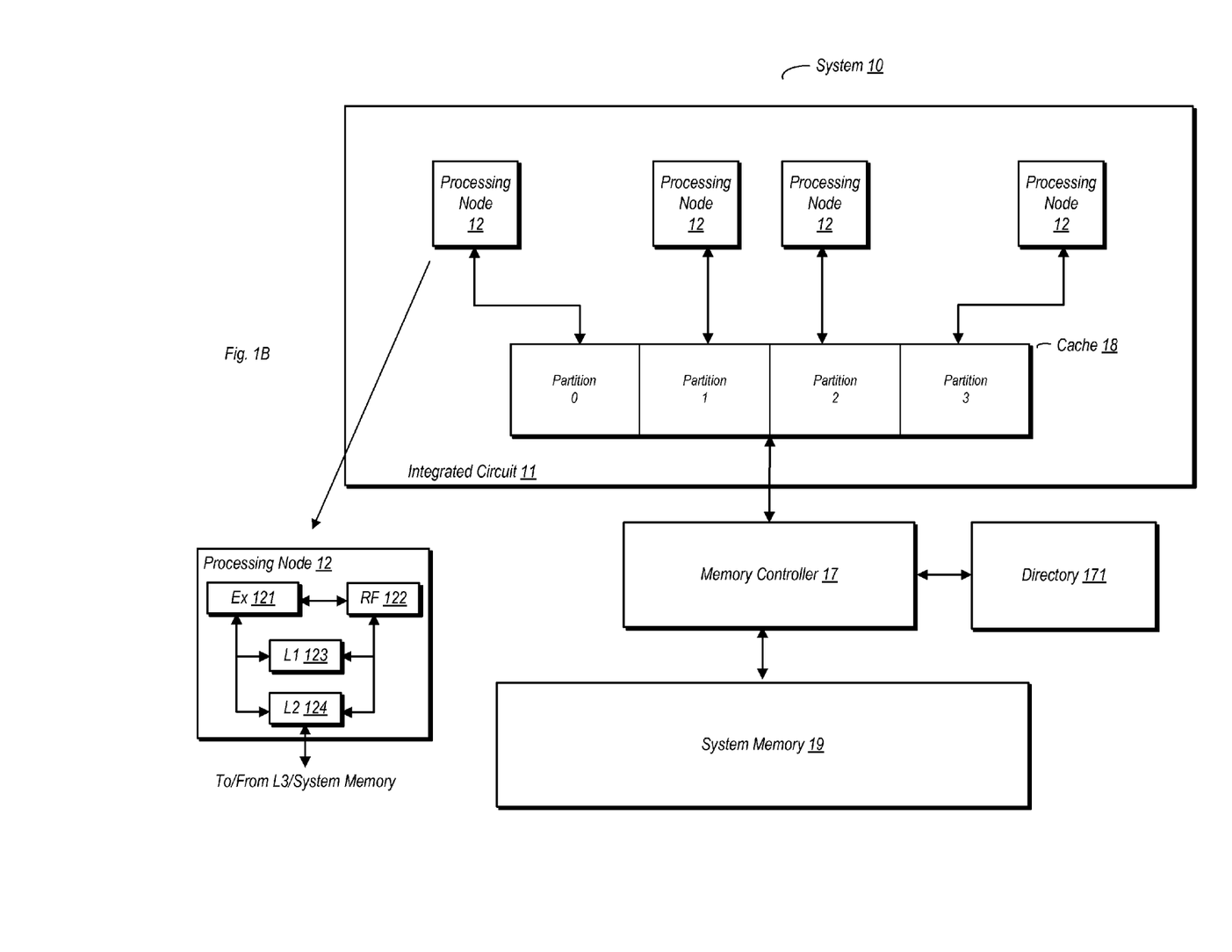
FIG. 1B is a block diagram of another embodiment of a system having multiple processing nodes.

FIG. 1B illustrates an alternate embodiment of system 10. In this example, each of the processing nodes 12 and cache 18 are implemented on an IC (i.e., on the same IC die). Accordingly, each processing node 12 is a processor core in this example. Furthermore, each partition of cache 18 is dedicated to a single instance processing node 12. In general, partitions may be dedicated to a single processing node 12 or multiple instances thereof, with each processing node 12 assigned to a single one of the partitions.

FIG. 1B also illustrates further one embodiment of a processing node 12. In the embodiment shown, processing node 12 includes at least one execution unit 121, which is configured to execute instructions provided thereto. Operands to be used in the execution of instructions may be provided from registers in register file 122. Each processing node 12 in the embodiment shown also includes an L1 cache 123 and an L2 cache 124. The L1 cache 123 may, in one embodiment, actually be two separate caches, one dedicated to storing instructions and the other dedicated to storing data. L2 cache 124, on the other hand, may be a unified cache that stores both instructions and data.

Generally speaking, each level of cache memory, in descending order, may provide more storage than the previous level. For example, L2 cache 124 may provide more storage than L1 cache 123, while cache 18 (an L3 cache in this embodiment), may provide more storage than either of the L1 and L2 caches in a given processing node 12. Furthermore, in some embodiments, each partition of cache 18 may by itself provide more storage than either of the L1 and L2 caches in a correspondingly coupled processing node 12.

When information is requested by a particular processing node 12 and is not already present in a register of register file 122, it may be obtained from elsewhere in the memory hierarchy. A processing node may first query an L1 cache in search of the requested information. In the case where separate L1 caches are provided for instructions and data, the appropriate one of the L1 caches is queried. If the requested information is not found in an L1 cache, a query to the corresponding L2 cache may be made. If the requested information is not found in the L2 cache, then a query may be made to a partition of cache 18 that corresponds to the requesting processing node 12. As will be discussed below, if the requested information is not found in the queried partition, a determination may be made as to whether to snoop (i.e. perform a query in) other partitions of cache 18, or to forego the snoop and to access the directory 171 to determine the location of the requested information. If the requested information is not found in cache 18, it may be found in system memory 19.

Figure 2:
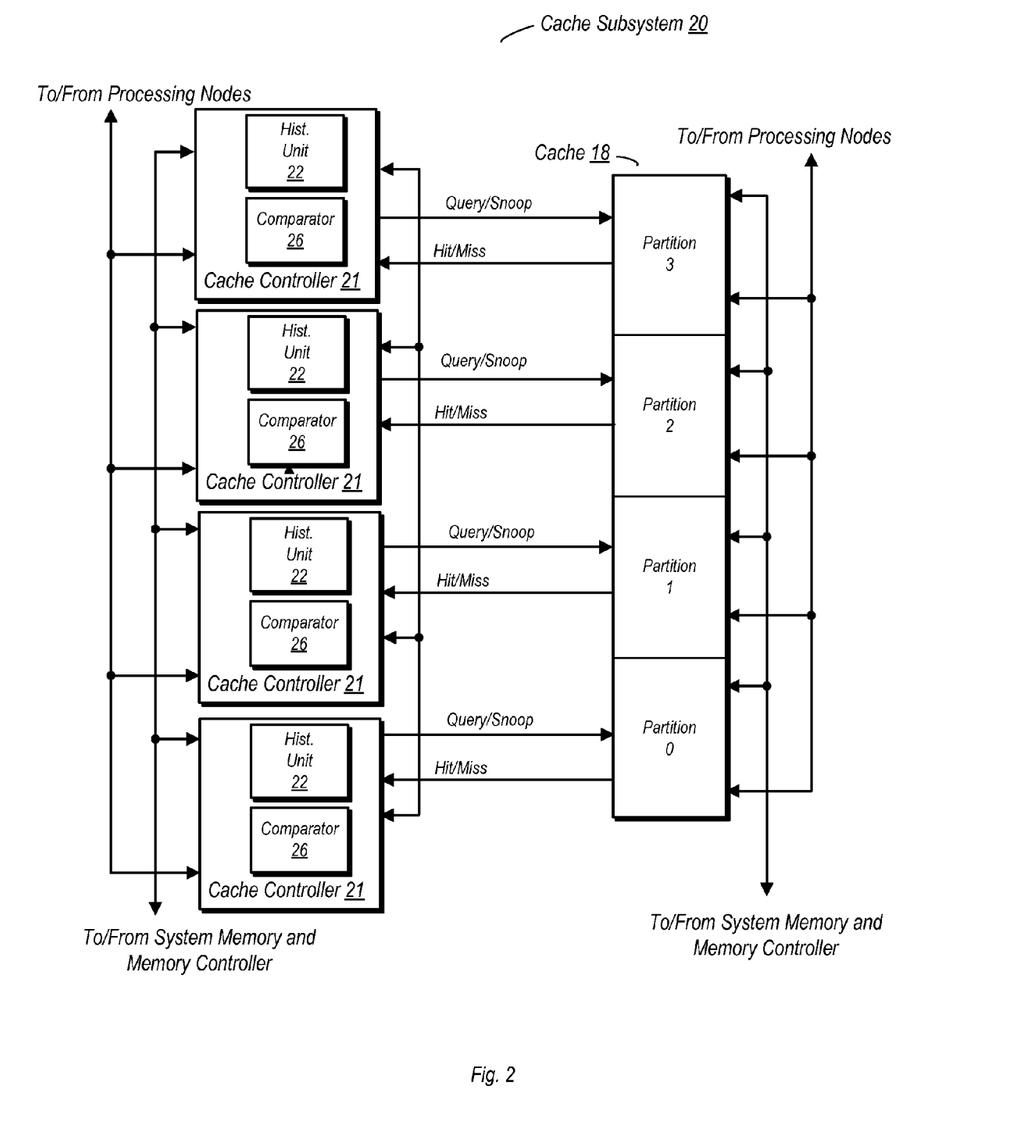
FIG. 2 is a block diagram of one embodiment of a cache subsystem.

Cache 18 may be part of a cache subsystem. FIG. 2 illustrates on embodiment of a cache subsystem 20 that includes cache 18. In the embodiment shown, cache 18 is coupled to a number of cache controllers 21, each of which is in turn is associated with one of the partitions of cache 18. Among the functions of the cache controllers 21 are storing information (instructions or data) therein, conducting queries to determine if information requested by one of the processing nodes 12 is stored in its corresponding partition, evicting cache lines, updating modified cache lines, and so forth. Each of the cache controllers 21 in the embodiment shown is coupled to the other ones of the cache controllers, and may receive snoop requests from two different sources: 1) the processor core(s) associated with its corresponding partition, and 2) other ones of the cache controllers 21. It is noted that embodiments are also possible and contemplated in which only a single cache controller is implemented in lieu of cache controller for each partition. In such embodiments, the single cache controller may include the history units 22 discussed below.

In the embodiment shown, each partition of cache 18 is associated with a history unit 22 implemented within its corresponding cache controller 21. Each history unit 22 is coupled to receive information regarding hits and misses from its corresponding partition. In particular, each history unit 22 may record history information regarding the most recent N misses in its corresponding partition, wherein N is an integer value. The history may indicate, for each of the most recent N misses, the source of the information for which the query produced the miss. In particular, the history information may indicate for each corresponding miss in its corresponding information whether the queried information was found in another partition of cache 18 or from memory. This history may be used by the corresponding cache controller 21 when a miss occurs in the associated partition to determine whether to snoop in other partitions of cache 18. As defined herein, a miss may occur when a cache (or partition of a cache) is queried for information (data or instructions) and the information is not found therein. A hit may be defined as when the requested information is found in the queried cache or queried partition thereof.

Each cache controller 21 includes a comparator 26. Responsive to a miss in the associated partition of cache 18, comparator 26 may access the corresponding history unit 22. The history stored therein may be compared to at least one threshold. Thus, based on at least one comparison of the history to a threshold value, comparator 26 may determine whether or not cache controller 21 is to send requests to the other cache controllers to snoop their respective partitions in the cache to determine if they are storing the requested information (i.e., the requested data or instruction that resulted in a miss in that particular partition). For example, if a cache miss occurs in Partition 0, the history in its corresponding history unit 22 may be compared to one or more thresholds by its corresponding comparator 26. If the history indicates that recent misses in Partition 0 have resulted in a high level of success of finding the requested information in other partitions, then the corresponding cache controller 21 may request snoops of Partitions 1, 2, and 3. If, on the other hand, the history indicates that recent misses in Partition 0 have resulted in a low level of success of finding the requested information in any of Partitions 1, 2, and 3, then the corresponding cache controller 21 may forego the requesting of snoops in these partitions, instead indicating to memory controller 17 to locate the requested information by a lookup in directory 171.

Generally speaking, if the history indicates a high level of success in finding requested information in other partitions of the cache after misses in a given partition, the corresponding cache controller 21 may request the other cache controllers 21 perform snoops of their respective partitions responsive to a current miss. On the other hand, if the history indicates a low level of success in finding requested information in other partitions after misses in a given partition, the corresponding cache controller 21 may forego requesting that snoops be performed in the other partitions. This may assist in optimizing snoops in the other partitions, since snoops are conducted primarily when they are indicated by the history to likely be successful.

If a snoop of other partitions is not performed responsive to a miss in a given partition, memory controller 17 (as shown in FIGS. 1A and 1B) may perform a search of the directory 171. If the requested information is stored in memory, the search of directory 171 may indicate its location therein. In some cases, the requested information may also be stored in a partition of cache 18 (even though a snoop to the other partitions was not performed). Upon locating the requested information, memory controller 17 may provide the information to the corresponding cache controller 21. Thereafter, the history unit 22 associated with the partition in which the miss occurred may be updated to indicate the location from which the requested information was ultimately provided.

Accordingly, responsive to a miss in its corresponding partition, a history unit 22 may be updated in one of the following ways. If a snoop is performed of other partitions and the result is a hit, the history in history unit 22 is updated to indicate that the requested information was provided from cache 18. If no snoop of the other partitions is performed, but the lookup in the directory indicates that the requested information was nevertheless stored in cache 18 (from where it is ultimately provided), the history in history unit 22 is again updated to indicate that the requested information was provided from cache 18. If the requested information is not found in cache 18 (irrespective of whether a snoop of other partitions was performed), then the history in history unit 22 is updated to indicate that the data was provided from memory. Each cache controller 21 may determine, on subsequent misses, to cause the other cache controllers 21 to perform snoops of their respective partitions when the history information indicates a high rate or high number of instances of previously requested information being found in other partitions of cache 18. If the history information indicates a low rate or low number of instances of previously requested information being found in other partitions of cache 18, it may forego requesting snoops of the other partitions for a present miss in the corresponding partition.

In some embodiments, multiple instances of a history unit 22 may be provided for each partition. For example, each partition may be associated with a first history unit 22 to track history pertaining to misses produced by queries for instructions, and a second history unit 22 to track history pertaining to misses produced by queries for data. This may account for the fact that the caching behavior may be different for instructions and data. In another embodiment, multiple history units 22 may be provided on a per thread basis. For example, each partition may be dedicated to particular threads, and these threads may exhibit different behavior from one another. Accordingly, history may be accumulated for each active thread assigned to a partition and may be evaluated by comparator 26 according to appropriate criteria. As an alternative to multiple history units 22 for each partition, a single history unit 22 may be configured to track multiple histories such as those described above.

Figure 3A:
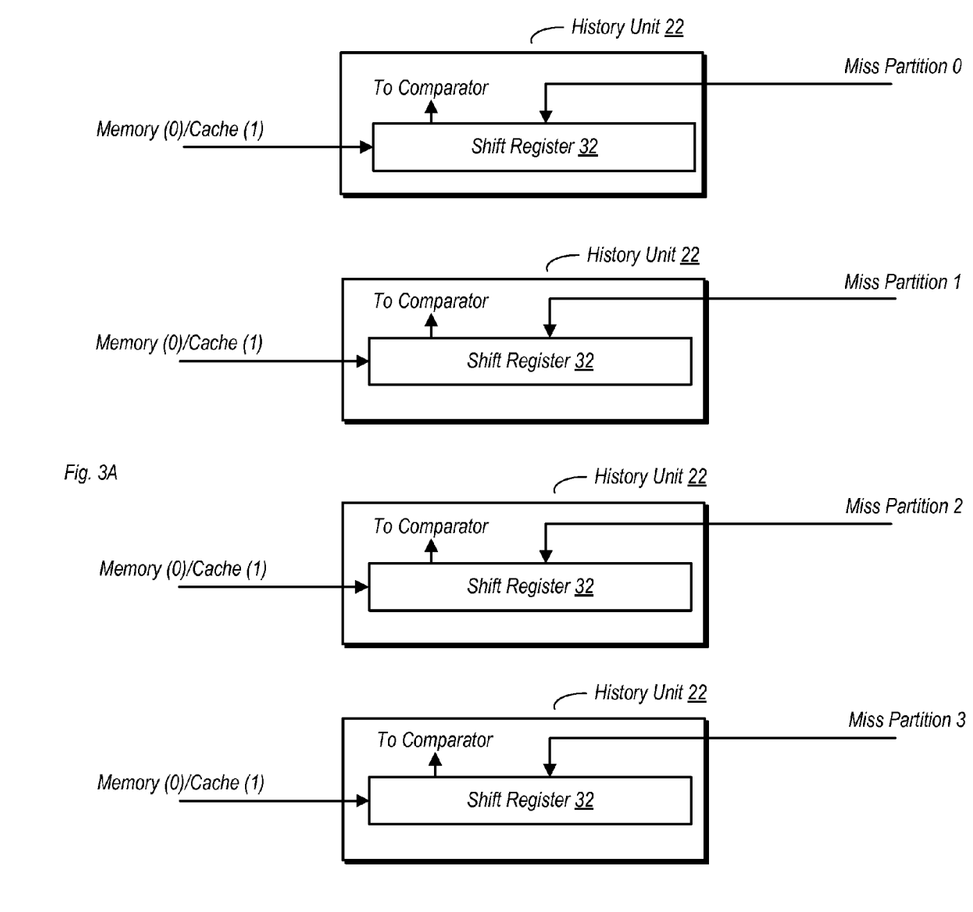
FIGS. 3A, 3B, and 3C are block diagrams illustrating various embodiments of a history unit.

FIG. 3A illustrates a number of history units 22 in accordance with one embodiment. In this embodiment, each history unit 22 is implemented using shift registers 32. Each shift register 32 is coupled to receive a signal indicating a miss from its corresponding one of the partitions (e.g., Miss Partition 0). The miss signal may serve as an enable signal that allows the writing of information into the receiving shift register 32. Subsequent to a miss in a given partition, and the assertion of the corresponding miss signal, a logic 0 or a logic 1 may be written into a location of the corresponding shift register 32. In this particular embodiment, a logic 0 is shifted into shift register 32 when the requested information that produced the cache miss is provided from main memory. A logic 1 is shifted into shift register 32 in this embodiment when the requested information is provided from another partition in the cache. Shift register 32 is not updated when a cache hit occurs in its corresponding partition.

Each shift register 32 may include N entries, wherein N is an integer value. For example, one embodiment of shift register 32 may include 64 single bit storage locations. However, this number may vary from one embodiment to the next. When a new bit is shifted in, the oldest bit may be evicted from shift register 32.

Prior to writing a new bit into a shift register 32 in response to a cache miss, the currently stored history therein may be sent to the comparator 26. The comparator 26 may compare the history information to at least one threshold. For example, the history may be compared to a threshold M, wherein M is an integer value less than N, and may indicate the number of instances that requested information producing previous cache misses in the corresponding partition was found in another partition of cache 18. If the number of instances exceeds the threshold M (thereby indicating a higher level of success of finding the requested information elsewhere in the cache within the last N misses in that partition), cache controller 21 may snoop the other partitions. On the other hand, if the number of instances is less than the threshold M, then cache controller 21 may forgo a search and provide an indication to memory controller 17 to conduct a search of the directory 171 for the requested information. The search of the directory may indicate where in memory the requested information is stored, and may also indicate whether the requested information is stored in one of the partitions of cache 18. Accordingly, it is possible for a shift register 32 to be updated with an indication that the requested information was actually stored in cache 18 even if no snoop of the other partitions was conducted. If the requested information is not stored in cache 18, the shift register 32 corresponding to the partition in which the miss occurred is updated to indicate that it was located in memory.

In some embodiments, a comparator 26 may compare the history information to more than one threshold. For example, an embodiment is contemplated where the history information is used by comparator 26 to not only indicate how many of the most recent N misses resulted in the requested information being found in another partition, but also information indicative of a more current trend. Consider an example where N=64, and a threshold value M=32. Comparator 26 may determine whether the threshold M is exceeded in comparisons such as those discussed above. However, comparator 26 may also consider a smaller number of instances for the most recent history. For example, if the threshold M is exceeded, but none of the most recent X (where X=16 in this example) entries in the history register indicate that requested data was found in another partition, cache controller 21 may forego snooping other partitions based on an indicated trend of less success. On the other hand, if the threshold M is not exceeded, but most or all of the most recent X entries of a history register indicate success finding requested information in other partitions (indicating a trend toward more successful snoops), cache controller 21 may conduct a snoop of the other partitions.

In general, the algorithms used to determine whether to conduct snoops in other partitions responsive to a miss in a particular one may vary from one embodiment to the next while still utilizing indications of history for the most recent misses. Information such as overall successes in finding requested information within the most recent misses and various possible trends therein may be determined by comparator 26, and this information may be combined in any suitable manner to determine whether to snoop other partitions responsive to a current miss.

Figure 3B:
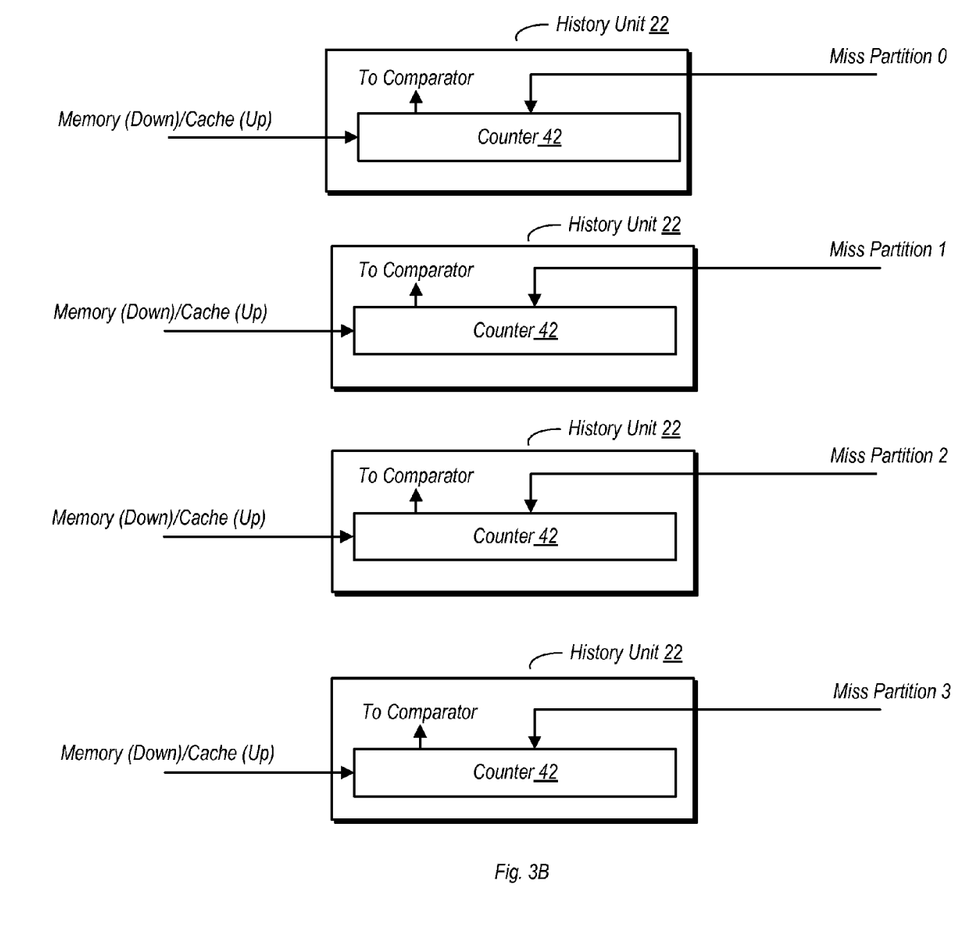

FIG. 3B illustrates a number of instances of an alternate embodiment of a history unit 22. In this particular embodiment, in lieu of registers, counters 42 are provided. Each counter 42 may be enabled responsive to a miss in its corresponding partition. After the requested information is provided, either from the cache or the memory, the corresponding counter may be toggled. In this case, the counter may be incremented if the requested information is provided from another partition in the cache and decremented if the requested information is provided from the system (main) memory. Responsive to each miss, the count value (prior to updating) may be provided to comparator 26, and may be used as a basis for determining whether a snoop is to be performed in other partitions. Higher count values may indicate more recent successes in finding the requested information in other partitions of the cache. Conversely, lower count values may indicate fewer recent success in finding the requested information in other partitions of the cache.

Figure 3C:
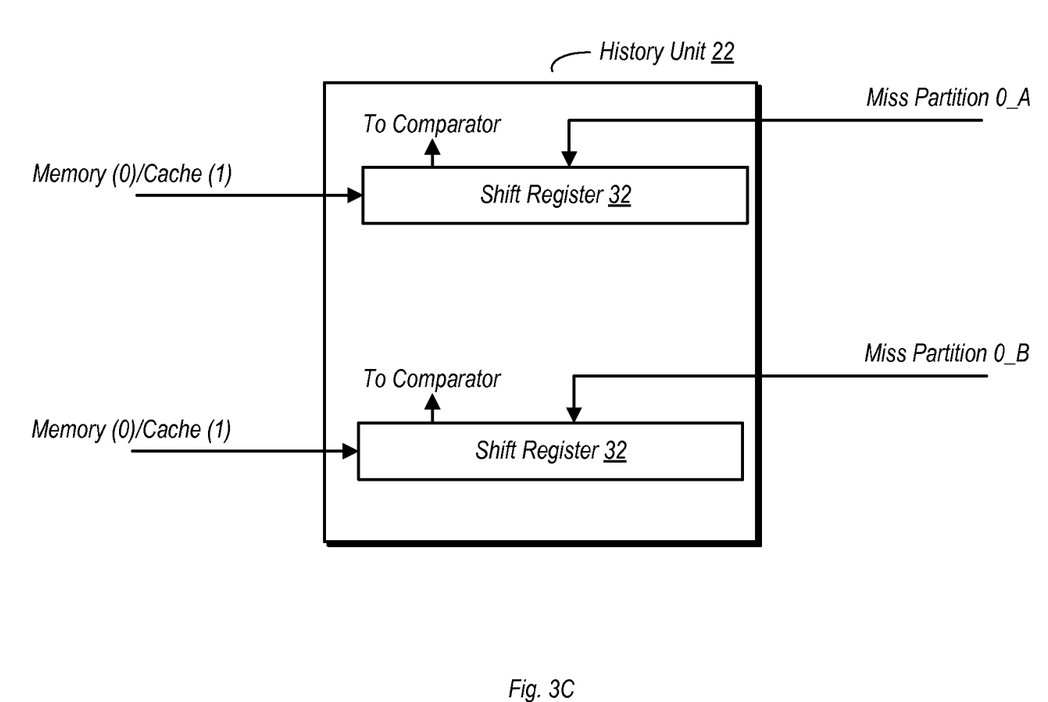

FIG. 3C illustrates one instance of a third embodiment of a history unit 22. In this particular example, two shift registers 32 are provided to store history for a given partition. The history stored in the shift registers 32 may be different from one another based on various factors. For example, a first one of the shift registers 32 may store history for misses in its corresponding partition related to instructions. A second one of the shift registers 32 may store history for misses in its corresponding partition for related to data. In another embodiment, a first shift register 32 may be provided for a thread, while a second history register may be provided for a second thread. The number of shift registers (or counters) and their associations with instructions, data, threads, and so forth, may vary from one embodiment to the next, and thus the embodiment shown here is not intended to be limiting. Rather, FIG. 3C is provided to illustrate that a single history unit 22 may be implemented to track the miss history for multiple types of information, multiple threads, or other parameters. The provision of multiple registers, multiple counters, or other mechanisms for each partition may account for different types of behaviors. For example, the caching behavior of instructions may differ with respect to that of data. Similarly, the behavior of one type of thread may differ from another. Accordingly, the history for misses in a partition of the cache may be separated by thread, information type (instructions or data) or any other appropriate manner, and threshold and algorithms for determining whether to snoop other partitions responsive to a miss may be adjusted accordingly. The implementation of such circuitry may allow further optimization of the decision making process in determining whether to perform such snoops.

Figure 4:
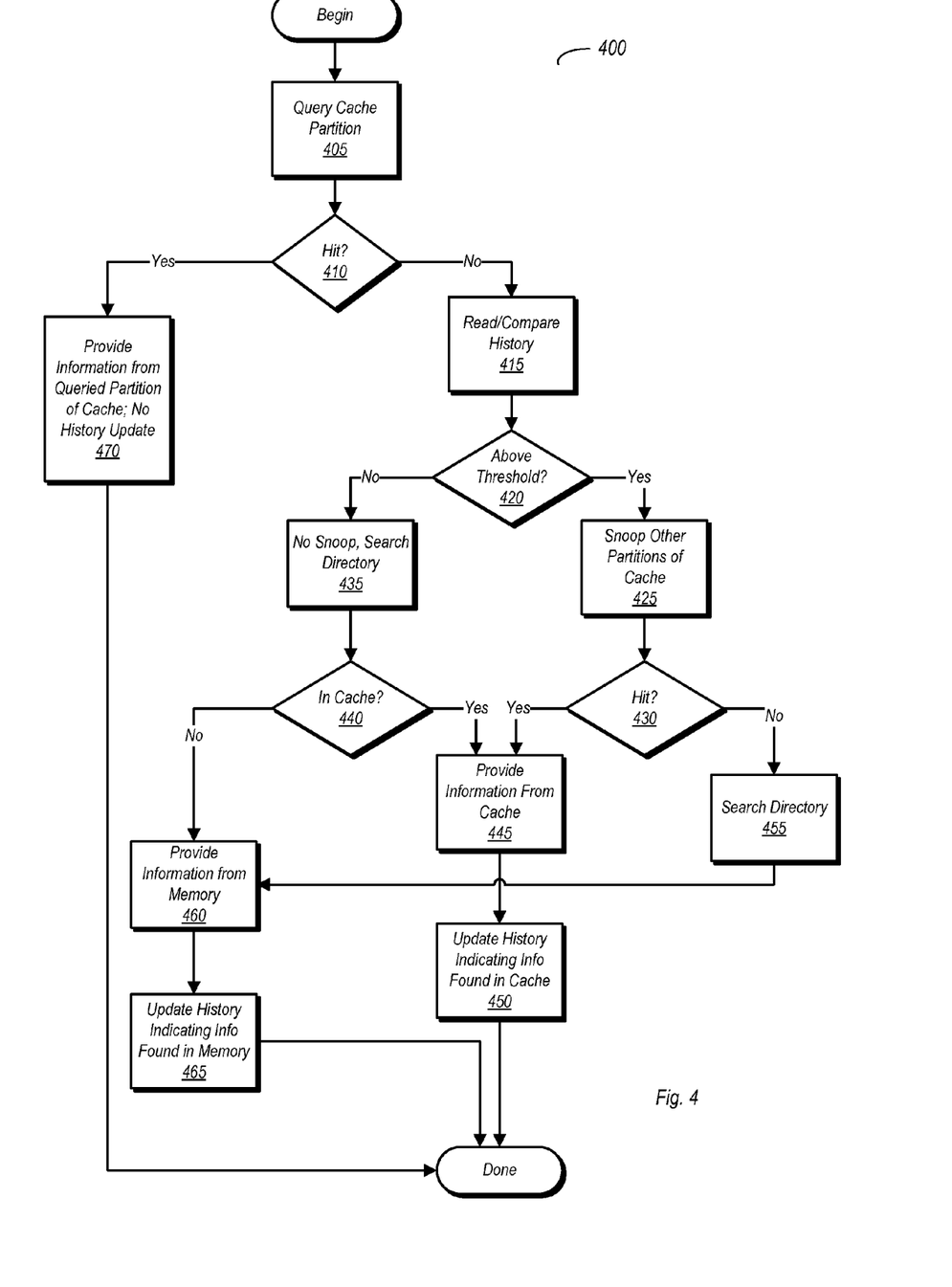
FIG. 4 is flow diagram of one embodiment of a method for operating a cache subsystem.

FIG. 4 is a flow diagram illustrating one embodiment of a method for operating a cache subsystem. Method 400 in the embodiment shown may be performed by any of the hardware embodiments discussed above, variations thereof, or other hardware embodiments not explicitly discussed herein. It is also contemplated that method 400 may be performed in part or even in full by software.

Method 400 begins with a query for information to a partition of a cache (block 405). The cache may be one that includes a number of partitions, and each of the partitions may be assigned to one or more processing nodes (e.g., processor cores on a multi-processor chip). Alternatively, each partition may be assigned to one or more threads executing on the various processing nodes. Each core, or thread, may be assigned to one partition only. The information requested may comprise instructions or data.

If the query to the partition results in a hit (i.e. the requested information is found in the partition; block 410, yes), then the information is provided, and no update is conducted to the miss history for that partition (block 470). However, if the query to the partition results in a miss (i.e. the requested information is not found in the partition, block 410, no), then miss history for that partition is read and compared to one or more thresholds (block 415). For the purposes of this example, only one threshold is discussed, however it is understood that the miss history may be compared in various ways to more than one threshold. The miss history, as discussed above, may be history indicating where requested information was found (i.e., another partition of the same cache or memory) after a miss in the corresponding partition.

If the comparison indicates that the history value is above the threshold (block 420, yes) then a snoop may be conducted in other partitions of the cache to search for the requested information (block 425). If the snoop of other partitions results in a hit (i.e. the requested information is found in another one of the partitions; block 430, yes), then the information is provided from the cache (block 445). Thereafter, the history information is updated in a history unit associated with the partition in which the miss occurred (block 450) to indicate that the requested information that resulted in the current miss was found elsewhere in the cache.

If the snoop of the other partitions does not result in a hit (block 430, no), then a directory is informed of the cache miss and thereafter, the location of the requested information is determined by a search of the directory (block 455). The search of the directory may determine where the requested information is stored in memory. If not in memory, the requested information is obtained from bulk storage and written thereto. Irrespective of whether it is initially found in memory, the requested information is eventually provided from memory (block 460). Thereafter, the history information is updated in a history unit associated with the partition in which the miss occurred (block 465) to indicate that the requested information that resulted in the current miss was provided from memory.

If the comparison indicates that the history value is below the threshold (block 420, no) then no snoop is conducted in other partitions of the cache, and instead, a directory is searched (block 435). The search of the directory may indicate wherein in memory that the requested information is stored. Nevertheless, it is still possible that the requested information is also stored in another partition of the cache, and this may also be determined by searching the directory. If the search of the directory indicates that the information is in another partition of the cache (block 440, yes), then the information is provided therefrom (block 445). Thereafter, the history information is updated in a history unit associated with the partition in which the miss occurred (block 450) to indicate that the requested information that resulted in the current miss was found elsewhere in the cache, even though no snoop of other partitions was performed.

If the search of the directory indicates that the information is not in the cache (block 440, no), then the requested information is provided from memory (block 460). This may include writing the requested information into memory from bulk storage if the requested information is not initially found in memory. Irrespective of whether a page fault is generated, the history information associated with the cache partition in which the miss occurred is updated to reflect that requested information for the current miss was provided from memory (block 465).

Numerous variations and modifications will become apparent to those skilled in the art once the above disclosure is fully appreciated. It is intended that the following claims be interpreted to embrace all such variations and modifications.

What is claimed is:

1. A system comprising:
a plurality of processing nodes;
a first cache memory, wherein the first cache memory is subdivided into a plurality of partitions, wherein each of the plurality of processing nodes is associated with a corresponding unique one of the plurality of partitions, and wherein each of the plurality of partitions is dedicated to store information for its corresponding ones of the plurality of processing nodes;
plurality of history circuits each associated with a unique one of the plurality of partitions of the first cache memory, wherein each of the plurality of history circuits is configured to store history indicating whether requested information from previous queries was found in another one of the plurality of partitions responsive to a miss in its corresponding one of the plurality of partitions, wherein the plurality of history circuits comprises a plurality of history registers, wherein each of the plurality of history registers is configured to store history pertaining to a most recent N misses in their unique one of the plurality of partitions, wherein N is an integer value, wherein the history registers include an instruction history register and a data history register each associated with a corresponding unique one of the plurality of partitions, wherein the instruction history register is configured to store information regarding a most recent N misses for instruction queries in its corresponding unique one of the plurality of partitions, and wherein the data history register is configured to store information regarding a most recent N misses for data queries in its corresponding unique one of the plurality of partitions; and
a cache controller configured to, responsive to a miss in a particular one of the plurality of partitions, determine whether to snoop other ones of the plurality of partitions for currently requested information based on the history stored in a corresponding one of the plurality of history circuits.

2. The system as recited in claim 1, further comprising a plurality of cache controllers, wherein each of the cache controllers is associated with a corresponding one of the plurality of partitions, and wherein each of the cache controllers includes a corresponding one of the plurality of history registers, wherein each of the cache controllers is configured to update its corresponding one of the plurality of history registers responsive to the currently requested information being found in one of the plurality of partitions not associated with the one of the plurality of history registers.

3. The system as recited in claim 1, further comprising a plurality of cache controllers, wherein each of the cache controllers is associated with a corresponding one of the plurality of partitions, and wherein each of the cache controllers includes a corresponding one of the plurality of history registers, wherein each of the cache controllers is configured to update its corresponding one of the plurality of history registers responsive to a determination that the currently requested information was not stored in the first cache memory.

4. The system as recited in claim 1, further comprising a plurality of cache controllers, wherein each of the cache controllers is associated with a corresponding one of the plurality of partitions, and wherein each of the cache controllers includes a corresponding one of the plurality of history registers, wherein the each of cache controllers is configured to inhibit updates to its corresponding one of the plurality of history registers responsive to a hit in its corresponding one of the plurality of partitions.

5. The system as recited in claim 1, wherein the first cache memory is one of a plurality of cache memories in a memory hierarchy, wherein the memory hierarchy includes a system memory, and wherein the first cache memory is a last level cache located between the system memory and each remaining one of the plurality of cache memories.

6. The system as recited in claim 1, wherein the cache controller is configured to compare information stored in one of the plurality of history circuits to at least one threshold value wherein comparing is performed responsive to a miss in a one of the plurality of partitions corresponding to the one of the plurality of history circuits.

7. A method comprising:
reading a first one of a plurality of history registers responsive to a miss during a query of a partition of a cache memory having a plurality of partitions, wherein each of a plurality of processing nodes and each of the plurality of history registers is associated with a corresponding unique one of the plurality of partitions, wherein each of the plurality of partitions is dedicated to store information for its corresponding ones of the plurality or processing nodes, and wherein each of the plurality of history registers includes a plurality of locations configured to indicate a source which provided requested information for a corresponding one of N previous queries to its corresponding one of the plurality of partitions, wherein N is an integer value;
determining from history information stored in the first one of the plurality of history registers whether previously requested information was found in another one of the plurality of partitions responsive to a miss in its corresponding one of the plurality of partitions; and
based on history stored in the first one of the plurality of history registers, determining whether to snoop other ones of the plurality of partitions in search of currently requested information.

8. The method as recited in claim 7 further comprising each history register storing history information for a most recent N misses in its associated one of the plurality of partitions, wherein for each of the most recent N misses.

9. The method as recited in claim 8, further comprising:
comparing the history information stored the first one of the plurality of history registers to at least one threshold value;
conducting a snoop of the other ones of the plurality of partitions responsive to determining that the at least one threshold value is exceeded; and
reading from a directory, without conducting a snoop of the other ones of the plurality of partitions, responsive to determining that the at least one threshold is not exceeded.

10. The method as recited in claim 7, further comprising updating the history information stored in the first one of the plurality of history registers responsive to a miss in its corresponding one of the plurality of partitions.

11. The method as recited in claim 10, further comprising:
updating the first one of the plurality of history registers with a first value if the requested information was provided from one of the plurality of partitions that is not associated with the first one of the plurality of history registers; and
updating the first one of the plurality of history registers with a second value if the requested information was provided from system memory.

12. The method as recited in claim 7, further comprising inhibiting updates of the first one of the plurality of history registers responsive to a hit in its corresponding one of the plurality of partitions.

13. An integrated circuit comprising:
a plurality of processor cores;
a last level cache memory subdivided into a plurality of partitions, wherein the last level cache memory is one of a plurality of cache memories implemented on the integrated circuit, the last level cache memory being lower in a memory hierarchy than each other one of the plurality of cache memories, and wherein each of the plurality of processor cores is associated with a unique one of the plurality of partitions; and
a cache controller configured to, responsive to a miss in a particular one of the plurality of partitions, determine whether to query other ones of the plurality of partitions based on a history of N previous queries to the particular one of the plurality of partitions, the history indicating a source which provided requested information for each of the N previous queries, wherein N is an integer value; and
a plurality of history registers each associated with a unique one of the plurality of partitions and wherein each of the plurality of partitions is associated with at least one history register, wherein each history register includes a plurality of locations configured to indicate the source which provided requested information for a corresponding one of the N previous queries.

14. The integrated circuit as recited in claim 13, wherein each of the plurality of locations in a given one of the plurality history register is configured to store a first value if requested information of a corresponding query was provided from one of the plurality of partitions not associated with the given one of the plurality of history registers, and further configured to store a second value if the requested information of the corresponding query was provided from a system memory.

15. The integrated circuit as recited in claim 13, wherein the plurality of history registers includes, for each of the plurality of partitions, a first history register and a second history register, wherein the first history register is configured to store history pertaining to a most recent N queries for data that resulted in a miss in its corresponding one of the plurality of partitions, and wherein the second history register is configured to store history pertaining to a most recent N queries for instructions that resulted in a miss in its corresponding one of the plurality of partitions.

16. The integrated circuit as recited in claim 13, further comprising a memory controller configured to cause an update of history stored in one of the plurality of history registers responsive to a miss in its corresponding one of the plurality of partitions, and wherein the memory controller is further configured to inhibit updates to the one of the plurality of history registers responsive to a hit in its corresponding one of the plurality of partitions.

17. The integrated circuit as recited in claim 13, wherein the plurality of processor cores includes a plurality of subsets of processor cores, each of the plurality of subsets of processor cores including at least two processor cores, and wherein each of the plurality of partitions is dedicated to provide cache storage for processor cores of a unique one of the plurality of subsets.

* * * * *

UNITED STATES PATENT AND TRADEMARK OFFICE
CERTIFICATE OF CORRECTION

PATENT NO. : 9,734,071 B2
APPLICATION NO. : 14/713053
DATED : August 15, 2017
INVENTOR(S) : Leung et al.

It is certified that error appears in the above-identified patent and that said Letters Patent is hereby corrected as shown below:

In the Specification

In Column 3, Line 62, delete "and or" and insert -- and/or --, therefor.

Signed and Sealed this
Twenty-ninth Day of May, 2018

Andrei Iancu
*Director of the United States Patent and Trademark Office*